Dec. 19, 1961  D. O. LEIBY  3,013,485
APPARATUS AND METHOD FOR DEEP FRYING
Filed June 29, 1956
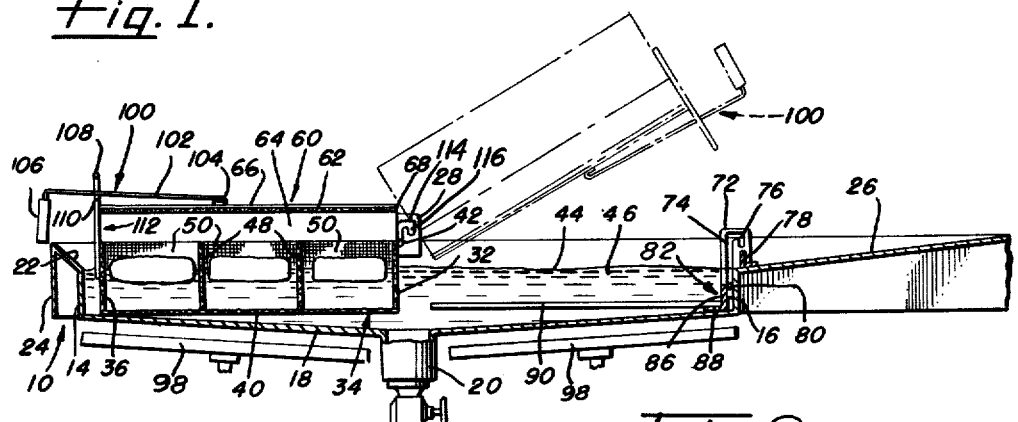
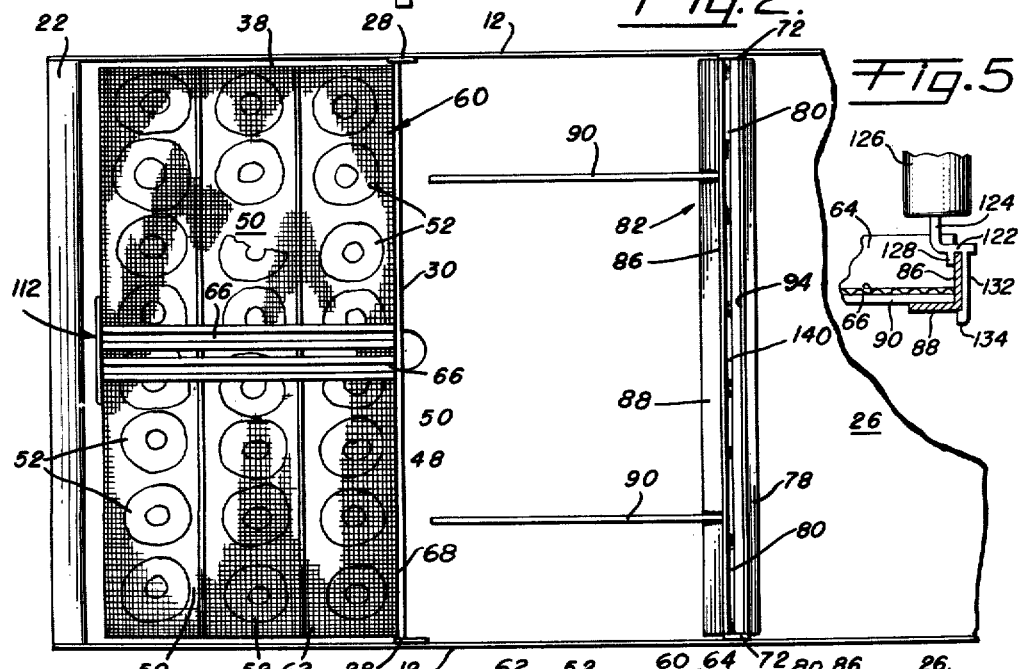
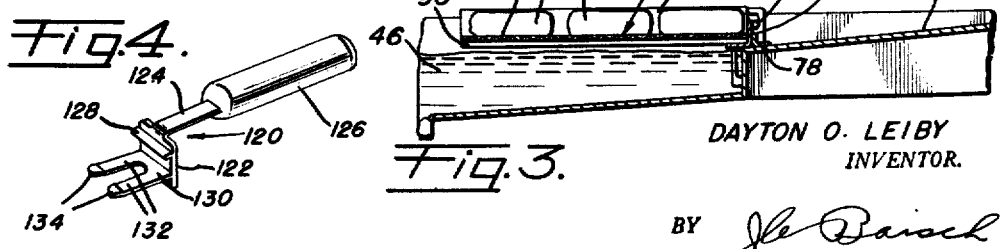
DAYTON O. LEIBY
INVENTOR.
BY *[signature]*
Attorney

United States Patent Office 3,013,485
Patented Dec. 19, 1961

3,013,485
APPARATUS AND METHOD FOR DEEP FRYING
Dayton O. Leiby, Alhambra, Calif., assignor to DCA Food Industries Inc., New York, N.Y., a corporation of New York
Filed June 29, 1956, Ser. No. 594,733
6 Claims. (Cl. 99—355)

This invention relates generally to cooking apparatus and relates more particularly to apparatus and method for deep frying.

While the invention has particular utility in the frying of doughnuts and the like, and is shown and described in connection therewith, it is to be understood that its utility is not confined thereto.

As the fat or shortening doughnuts are fried in is a food as much as the other ingredients used in making them the condition of such shortening is as important as the condition of such other ingredients and it is the poor condition of the grease absorbed by the doughnuts while being fried that makes them difficult to digest, often upsetting the stomach or even making those who eat them ill.

However, the maintenance of the proper condition of such shortening, fat or grease while deep frying large quantities of doughnuts is a major problem.

Heretofore, as far as applicant is aware, the kettles used for the grease for deep frying are relatively deep, at least six or eight inches and often deeper as is well known in the art, and a large volume or amount of such grease is contained in such kettles. Therefore, because of this large volume of grease in the kettle and its relatively great depth, an intense heat is required to maintain the grease in the frying region at the top surface of the body of the grease at the required temperature for frying the doughnuts. Further, the thermostat for controlling the heating means must be located in said cooking region of the grease so that said thermostat is relatively remote from said heating means, which is, of course, located beneath the kettle. Consequently, there is a substantial lag in the control of the heat and there are relatively wide variations in temperature of the grease in various regions, particularly in the region nearest the heating means. Also, because of the large amount of grease in the kettle, said grease is heated and cooled many times before it is used up by being absorbed by the doughnuts fried therein.

It has been found that it is the repeated heating and cooling of the grease that breaks it down and makes the fatty acids that are so harmful to persons eating same, such fatty acids being in effect poisons which, as pointed out above, may even make some people violently ill.

It is an object of the present invention to provide means that will solve the above problem of maintaining the shortening or grease in the kettle of deep frying apparatus in good condition so that doughnuts fried therein are far more digestible than heretofore.

Another object of the invention is to substantially eliminate the formation of fatty acids in the grease of such apparatus.

Still another object of the invention is to provide deep frying apparatus wherein the grease is maintained at a substantially uniform frying temperature.

A further object of the invention is to provide apparatus of this character wherein carbonization is eliminated, and the kettle and other parts do not become coated with carbon and hence may be easily kept clean. When these parts are made of stainless steel they are not only easy to keep clean but may be easily kept polished and bright.

A still further object of the invention is to provide means or apparatus of this character wherein a much smaller amount of shortening or grease is used at a time so that such grease will be used up in a relatively short time and replaced with fresh grease.

Another object of the invention is to provide apparatus of this character wherein a substantial reduction in the amount of grease required for frying is effected.

Still another object of the invention is to provide apparatus of this character wherein less fuel is required.

Thus, it will be apparent that the cost of cooking or frying doughnuts is materially reduced.

Many of the above advantageous results are secured by using a relatively shallow kettle. This, however, presents additional problems, such as the turning of the doughnuts, and it is another object of the present invention to effectively solve this problem.

The characteristics and advantages of the invention are further sufficiently referred to in connection with the following detailed description of the accompanying drawings which represent a preferred embodiment. After considering this example, skilled persons will understand that many variations may be made without departing from the principles disclosed, and I contemplate the employment of any structures, arrangements or modes of operation that are properly within the scope of the appended claims.

Referring to the drawings:

FIG. 1 is a cross sectional view through apparatus embodying the present invention;

FIG. 2 is a plan view of the same;

FIG. 3 is a sectional view of the portion of the apparatus where the second frying stage occurs, showing the doughnut holding tray in the raised position;

FIG. 4 is a perspective view of the raising device for said tray; and

FIG. 5 is a fragmentary view showing the raising tool engaging the tray support.

Referring more particularly to the drawings, the apparatus comprises a pan, indicated generally at 10 which will be termed the kettle herein. There is a central portion having vertical front and back walls 12, side walls 14 and 16, and a bottom 18, the latter being inclined from the vertical walls toward the center of the ketttle to which a drain valve 20 is attached by any suitable means such as spot welding, brazing or the like. From the upper edge of the side wall 14 there is an upwardly and outwardly inclined drain wall 22 from the outer edge of which is a depending part 24. From the upper edge of the wall 16 there is an outwardly and upwardly inclined drain board 26 and a skirt, not shown, depending from the free outer edge of the drain board 24.

A bracket 28 is secured to each wall 12 intermediate the ends thereof and is upstandnig from the upper edges of said walls. Each bracket is provided with a slot in the shape of an inverted J and the respective ends of a pivot rod 30 are slidably received in said slots, said rod being attached to the inner upper edge of the inner side wall 32 of a tray or basket, indicated generally at 34. Tray 34 includes, besides wall 32, an outer side wall 36, end walls 38 and bottom wall 40, and all of said walls are formed of wire screen or other suitable material. The purpose of using screen material is to permit free entrance of hot grease into the tray and free escape therefrom of said grease.

When the ends of the rod 30 are at the bottom of the long arms 42 of the slots in the brackets the outer portion of the bottom 40 rests on the bottom wall 18 of the kettle adjacent the outer side wall 14 thereof, the tray then being substantially horizontal with the upper edge above the upper surface 44 of the grease 46 in said kettle or pan which surface is not above the upper edges of the walls 14 and 16. The tray 34 also has partitions 48 which are spaced laterally apart and run from front to rear of said tray. The spaces 50 defined by the walls 32 and 36 and said partitions 48 are sufficiently wide to accommodate doughnuts 52 as best shown in FIG. 2.

There is a doughnut transfer tray, indicated generally at 60, which comprises a bottom 62 of screen, or which may be of perforated sheet metal or the like, having end walls 64 of a little greater height than the thickness of the doughnuts. On the bottom of the tray 60 are a plurality of transversely extending bars 66 secured to said bottom by any suitable means such as spot welding or the like.

At the front and rear ends of wall 16 are brackets 72 which have vertical grooves 74 just inwardly of said wall 16. At the top said grooves are turned to the right, as viewed in FIG. 1, and downwardly at 76 over the adjacent end of the drain board 26. In line with but below the plane of the lower ends of the part 76 are aligned angle irons 78 which are spot welded or otherwise suitably secured to said drain board 26 to serve as stop means as will be described more particularly hereinbelow.

The ends of a rod 80 of transfer tray support means 82 are slidably received in the slots of the brackets 72, said means 82 comprising an angle member extending from front to rear of the kettle, said member having a side 86 in a vertical plane, to the upper outer edge of which is secured said rod 80, and a side 88 which extends inwardly of the kettle in a substantially horizontal plane. A pair of arms 90 have ends secured to the side 88 by welding or other suitable means and extend inwardly toward the center of the kettle and substantially normal to said angle member. Arms 90 are spaced from the respective walls 12 and are spaced from each other in parallel relationship. When the support means 82 is in the lowered position, shown in FIG. 1, the ends of rod 80 are disposed at the lower ends of the inner vertical grooves 74 of the brackets 72 with the horizontal side 88 of the support means resting on the bottom 40 of the kettle adjacent the wall 16 thereof so that said arms 90 are substantially horizontal. The support member is movable upwardly and rearwardly to a position whereat the ends of said rod 80 are disposed in the lower ends of the parts 76 of the grooves of brackets 72, the horizontal side 88 of the support means then resting on the drain board 26 and the vertical side 86 resting against the upstanding sides 94 of the angle irons 78 so that again the arms 90 are held in substantially horizontal position but are located above the surface 44 of the grease 46 in said kettle as best shown in FIG. 3. When the support means is raised and moved to the last described position the ends of said rod 80 are moved upwardly in the grooves 74, outwardly and then downwardly into the portions 76 of said grooves. Reverse movement of the support means will effect movement thereof to the position in the bottom of the kettle.

When frying doughnuts, the grease is heated by gas burners 98 which are arranged to heat substantially the entire area of the bottom 18 of the kettle. However, it is to be understood that other heating means may be used.

The tray 34 is disposed in the position shown in FIG. 1 and the doughnuts put into the spaces or channels 50. The transfer tray is placed on the tray 34 with the free edges of the sides 64 thereof resting on the upper edges of the ends 38 and partitions 48 of said tray 34. The bars 66 are then at the top and when the doughnuts have been cooked on one side a turning tool 100 is used to turn the trays 34 and 60 over.

Turning tool 100 comprises an elongated part 102 having a downwardly and backwardly curved hook 104 at one end and a down turned portion at the opposite end on which is secured a handle 106. The part 102 is slidably received between the vertically spaced parallel horizontal parts 108 and 110 of a guide, indicated generally at 112, formed of wire of suitable guage, the free depending ends of the guide being secured to the side 36 of the tray 34. Part 110 of the guide is spaced inwardly somwehat above the bottom 62 of the transfer tray 60 when the latter is disposed on the tray 34, as best shown in FIG. 1. The hook 104 is slidable on the bars 66 and is positioned near the longitudinal center thereof, as shown in FIG. 1. After the doughnuts are cooked on one side, the superimposed trays are swung upwardly and clockwise by means of the handle 106 and the ends of the rod 30 are moved upwardly in the groove parts 42, rearwardly in the horizontal portions 114 and then into the depending portions 116. As the trays approach a horizontal position the tool 100 is pulled outwardly until the hook 104 engages the part 110 of the guide 112 so that the tool may be pivoted counter clockwise thereon to a generally upright position so that the transfer tray may be lowered onto the arms 90 and the tray 34 swung back to the position shown in FIG. 1, with the ends of the rod 30 returned to the bottom of the grooves 42. The doughnuts are then cooked on the other side.

When cooking is completed the support means 82 and the transfer tray 60 are raised by a raising tool 120 which comprises a plate 122 having a handle carrying part 124 turned at substantially a right angle at one edge, there being a handle 126 on said part 124. Adjacent said edge there is a transverse flange 128. Spaced therefrom and arranged in substantially parallel relationship is a forked member 130 having a pair of prongs 132 extending from said plate 122 in the same direction as said flange 128, the ends of said prongs having end portions 134 offset to the side of said member facing said flange.

In order to raise the support means 82 and tray 60 carried thereon, the prongs 134 are slipped downwardly at the outer side of said tray and said means. The flange 128 slips over the upper edge of the vertical side 86 of the support means while the prongs 132 slide along the outer side of said vertical side 86 of the support means, the offset portions 134 engaging beneath the corner or junction of the vertical side 86 and the horizontal side 88 as best shown in FIG. 5. The support means and tray 60 are then raised as the ends of the rod 80 slide upwardly in the groove 74, rearwardly in the horizontal portions of said grooves and downwardly into the depending portions 76 so that the support means and tray 60 are positioned as shown in FIG. 3. It is to be noted that the adjacent ends of the angle irons 78 are spaced apart at 140 sufficiently to accommodate the raising tool 120 when the support means 82 and tray 60 are raised and positioned as shown in FIG. 3. The tool 120 is then removed and an icing tray, not shown, placed on the transfer tray. The support means may be pivotally swung clockwise to position the icing tray on the drain board 26 and then swung back counter clockwise to the position shown in FIG. 2 or returned to the position shown in FIG. 1. The icing tray is then moved to the icing station. Alternatively the operator may use suitable gloves to take hold of the transfer tray and icing tray and turn them over and placed in an icing station, after which the transfer tray is removed. With either method the doughnuts are then iced.

It will be apparent that the kettle is shallow so that the depth of the grease between the bottom of the kettle and the cooking region where the thermostat, not shown, is located is very small (it may be about one inch or less), so the responses of the apparatus have very little lag, the temperature changes being in the neighborhood of 4° to 5°.

It is thought that the invention and many of its attendant advantages will be understood from the foregoing description and it is thought that it will be apparent that various changes may be made in the form, construction and arrangement of the parts of the invention and the method of operation thereof without departing from the spirit and scope thereof or sacrificing all of its material advantages, the embodiment hereinbefore described being merely a prescribed one.

I claim:

1. In doughnut cooking apparatus: a shallow kettle having front and rear walls, side walls, and a bottom; front and rear brackets secured to the front and rear walls adjacent the longitudinal centers thereof, said brackets extending upwardly of said walls and having slots therein in the shape of an inverted J; a basket having perforate front and rear walls, side walls, a bottom, and partition means providing compartments for doughnuts, one of the side walls of the basket extending between and transversely of the front and rear walls of the kettle; pivot means secured to said inner side wall of said basket, said pivot means having parts received in the slots of said brackets and movable from the lower end of the longer vertical portion of said slots to the lower end of the shorter vertical portion and vice versa, at least a portion of the basket resting on the bottom of the kettle when the ends of the pivot means are disposed at the bottom of the longer vertical arm of the bracket slots, a tray having a perforate bottom and front and rear walls, said tray being positioned on said basket with the free edges of the front and rear walls thereof resting on said basket; transverse rods secured to the under side of the tray adjacent the center thereof; a guide secured to said basket; a turning tool in said guide and engageable with said transverse rods on the tray to hold said tray on the basket when in one position and to release said tray when in another position, said tool engaging the guide when moved to the tray releasing position; tray supporting means receiving the tray when the latter is turned with said tool and released; front and rear brackets for said supporting means, secured to the kettle adjacent the opposite side thereof from the basket, said opposite side having a drain board and said brackets having grooves shaped in the form of an inverted J; stop means on said drain board below the shorter outer vertical portions of said grooves for the supporting means; said supporting means including a member extending from front to rear of the kettle; pivot means having ends slidably received in said grooves of the last mentioned brackets; and removable means for raising said tray to a position whereat the pivot means is in the bottom of the shorter arms of said grooves of the supporting means brackets and said tray member is in engagement with the stop means.

2. In doughnut cooking apparatus: a shallow kettle having front and rear brackets secured at the front and rear of the ketttle adjacent the center thereof, said brackets having slots therein in the shape of an inverted J; a perforate basket having compartments for doughnuts; a pivot rod secured to the upper edge of the basket, the ends of said rod being received in the slots of said brackets and movable from the lower end of the longer vertical portion of said slots to the lower end of the shorter vertical portion and vice versa, the basket resting on the bottom of the kettle when the ends of the pivot rod are disposed at the bottom of the longer vertical arms of the bracket slots, a tray having a perforate bottom and front and rear walls, said tray being removably positioned on said basket; a guide secured to the basket, said guide having a guide space for reception of a turning tool; a turning tool having an elongated body portion slidable in said guide, said turning tool having a hooked end portion and a handle at the opposite end, said hooked end portion engaging the bottom of said tray while said tray and basket are being turned and the pivot rod ends moved from one end of said J shaped slots to the other; said hooked portion engaging said guide when the tool is pulled outwardly of said guide to release said tray and return the basket to the normal position; tray supporting means receiving the tray when the latter is turned with said tool and released; and means for supporting and guiding front and rear brackets for said supporting means, between a position whereat said supporting means rests on the bottom of the kettle and a position whereat said supporting means is disposed above the level of grease in said kettle.

3. In deep frying apparatus: a shallow kettle including front, back and side walls; a partitioned basket at one side of said kettle, said basket including an inner side intermediate the side walls of the kettle; means pivotally mounting the inner side of said basket so that the latter may be swung upwardly, to the other side and downwardly and vice versa; a tray removably disposed on the top of said basket; tray supporting means in the other side of said kettle, said supporting means having arms extending toward the center of the kettle; means for operably mounting said supporting means with the arms in substantially a horizontal position; means for raising said supporting means and holding same in the raised position; and means for releasably securing the tray on the basket and holding same in said position while said tray and basket are being pivotally swung over the supporting means, said means being movable to a position whereat the tray is released and the basket is still engaged for returning same to the original position.

4. In deep frying apparatus: a shallow kettle; a basket at one side of said kettle; means pivotally mounting said basket so that the latter may be swung upwardly and to the other side of the kettle and vice versa; a tray removably disposed on top of said basket; means for releasably holding the tray on said basket and for swinging said tray and basket on the pivot means of said basket; tray supporting means in the other side of said kettle, said tray supporting means having arms extending toward the center of the kettle; means for mounting said supporting means with the arms in substantially a horizontal position; means for raising said supporting means and holding same in the raised position; and means for swinging said basket and tray, said means being movable to a position whereat the tray is released and the basket is still engaged so that same may be swung to the original position.

5. In deep frying apparatus: a shallow kettle; a basket at one side of said kettle; means operably mounting said basket so that the latter may be swung upwardly and to the other side of the kettle and vice versa; a tray removably disposed on the top of said basket; tray supporting means in the other side of said kettle; mounting means for said supporting means whereby said supporting means is supported in a position below the surface of grease in said kettle, said tray supporting means being movable to a raised position above said grease; and means for releasably securing the tray on the basket and holding same in said position while said tray and basket are being pivotally swung over the supporting means, said turning means being movable to a position whereat the tray is released onto said supporting means and the basket is still engaged for returning same to the first mentioned position.

6. In deep frying apparatus: a shallow kettle; a basket at one side of said kettle; means pivotally mounting said basket so that the latter may be swung upwardly and to the other side of the kettle and vice versa; a tray removably disposed on top of said basket; means for releasably holding the tray on said basket and for swinging said tray and basket on the pivot means of said basket; tray supporting means in the other side of said kettle, said tray supporting means having arms extending toward the center of the kettle; means for mounting said supporting means with the arms in substantially a horizontal position; and means for swinging said basket and tray, said means being movable to a position whereat the tray is released and the basket is still engaged so that same may be swung to the original position.

References Cited in the file of this patent
UNITED STATES PATENTS

| | | |
|---|---|---|
| 363,519 | Houston | May 24, 1887 |
| 549,401 | Smith | Nov. 5, 1895 |
| 616,420 | Korbel | Dec. 20, 1898 |
| 1,083,808 | Dunson | Jan. 6, 1914 |